W. W. LINCOLN.
DIRECTION SIGNAL FOR AUTOMOBILES.
APPLICATION FILED OCT. 7, 1920.
1,411,499.
Patented Apr. 4, 1922.
Fig. 1.
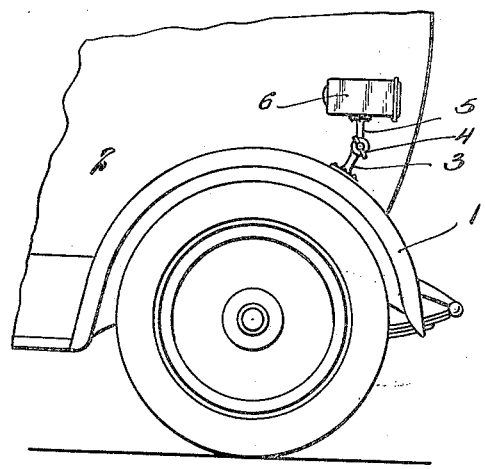
Fig. 2.
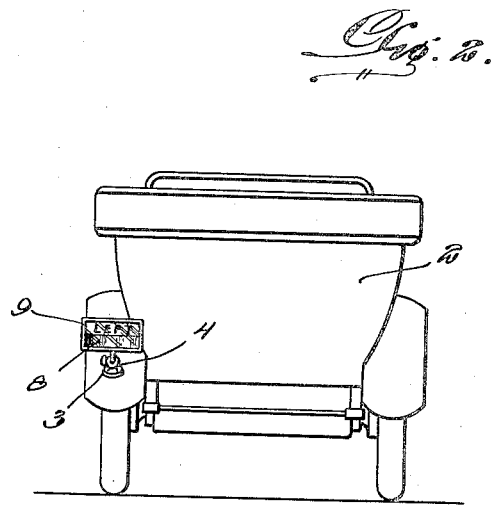
Fig. 4.
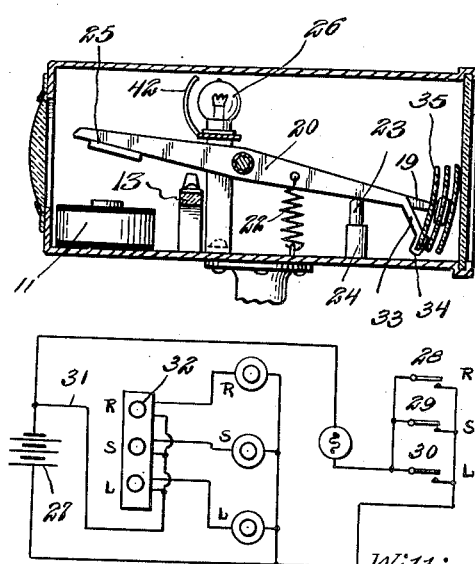
Fig. 3.
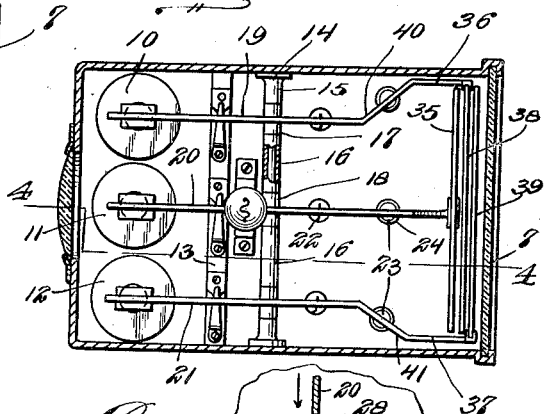
Fig. 6.
William W. Lincoln,
INVENTOR.
Witness:
F. L. Fox.
BY
ATTORNEY.

UNITED STATES PATENT OFFICE.

WILLIAM W. LINCOLN, OF WASHINGTON, DISTRICT OF COLUMBIA.

DIRECTION SIGNAL FOR AUTOMOBILES. REISSUED 1,411,499. Specification of Letters Patent. Patented Apr. 4, 1922.

Application filed October 7, 1920. Serial No. 415,332.

*To all whom it may concern:*

Be it known that I, WILLIAM W. LINCOLN, citizen of the United States, residing at Washington, in the District of Columbia, have invented certain new and useful Improvements in Direction Signals for Automobiles, of which the following is a specification.

My present invention has reference to a direction signal for automobiles and the like.

My primary object is to produce a visible signal mounted at the rear of a vehicle and adapted to indicate to vehicles or pedestrians in the rear of the vehicle provided with the signal, that the operator is about to stop or turn to the right or to the left.

A further object is the production of a visible direction signal which may be attached to any convenient part at the rear of any make of automobiles or similar vehicles which is especially adapted for night driving, as each of the signals, when brought to signalling position, is illuminated, but which may be also successfully employed in daytime, and wherein the signals are brought to operative position at a convenient point with respect to the driver of the vehicle.

With the foregoing objects in view, it is my purpose to arrange in a suitable casing that has a sight opening therein, an electric lamp which includes a number of normally opened switches which correspond in number with a plurality of magnets, the said magnets each having a circuit connected to the lamp circuit, and the last mentioned circuits having therein normally opened switches. In the casing, there is pivotally supported signal carrying arms or levers, the signals of which being arranged on the inner ends thereof to the rear of the lamp bulb, spring means being provided for normally retaining the arms or levers to arrange their signals in non-signalling position, and buffer means engaging the arms or levers when in such position, each arm or lever being arranged directly over the respective switches in the lamp circuit, and each arm or lever carrying an armature arranged directly over the respective magnets and designed to be attracted thereby when the separate switch means for the said armature circuits are closed, the swinging of the levers also closing the lamp circuit and lighting the said lamp whereby the signal will be rendered distinctly visible through the sight opening in the casing.

The foregoing, and many other objects which will appear as the nature of the invention is better understood, may be accomplished by a construction, combination and operative arrangement of parts, such as is disclosed by the drawings which accompany and which form part of this application.

In the drawings:—

Figure 1 is a fragmentary side elevation of a vehicle provided with the improvement.

Figure 2 is a rear elevation thereof.

Figure 3 is a horizontal sectional view through the casing taken directly above the signal carrying arms, and looking toward the bottom of the casing.

Figure 4 is a sectional view approximately on the line 4—4 of Figure 3.

Figure 5 is a detail elevation of one of the make and break switches in the lamp circuit, one of the signal carrying arms, which controls the switch being in section.

Figure 6 is a diagrammatic view illustrating the wiring.

In Figures 1 and 2 of the drawings, I have illustrated the improvement attached to one of the rear fenders 1 of an automobile 2. In this connection, I desire to state that the improvement may be arranged at any desired point at the rear of the machine.

The supporting means for the improvement includes a bracket arm 3 that is connected by an adjustable pivot 4 to a depending arm 5 in the signal casing 6. The arm 5 and the arm of the bracket 3, at their contacting points may be enlarged to provide circular heads, and the confronting faces of these heads may be serrated so that the casing 6 may be arranged at any desired angle with respect to the bracket. Also one of the heads may be threaded to engage the threaded shank of the bolt 4.

As disclosed by the drawings, the casing is preferably in the nature of a rectangular member which has its rear end opened and provided with guides for the reception of a reflector plate 7 that forms the closure for the said open end. Also the front of the casing may be entirely open and closed by a plate which may be of glass, the lower portion of which being frosted, so that the interior of the casing is not visible therethrough, but the upper portion of which is transparent and provides the sight opening.

For distinction, the lower portion of the outer face of the casing is indicated by the numeral 8 and the upper transparent portion thereof by the numeral 9. The glass closure plate for the front of the casing may be removably secured thereto in any desired or preferred manner.

Resting on the bottom wall of the casing, adjacent to the front thereof are three spaced magnets 10, 11 and 12 respectively. To the rear of the magnets the casing is provided with a transverse plate 13 of insulating material. Above, but to the rear of the plate 13 the casing has its sides provided with inwardly directed tubular boxes 14 that support therein the ends of a rod or shaft 15. Also on the rod 15 there are spaced tubular sleeves 16—16 designed to have their outer ends arranged in the path of contacting engagement with laterally extending barrels 17, and their inner ends contacting with a similar barrel 18 that are provided upon and extend laterally from levers or arms 19, 20 and 21, respectively. The arms 19, 20 and 21, to the rear of their mounting on the rod or shaft 15 are connected by springs 22 to the bottom of the casing. The springs not only serve to tilt the rods, but to hold the same against lateral movement, so that they serve as anti-rattlers for the rods. The swinging of the rods by the tension of the springs is resisted by compressible cushion members 23 which are received in cup-like receptacles 24 on the bottom of the casing.

Each of the rods 19, 20 and 21 has on its under face, adjacent to its outer end, an armature 25, and each of said armatures is disposed directly above the respective magnets 10, 11 and 12.

Above the arms 19, 20 and 21 is a suitably supported electric bulb 26. This bulb is in circuit with a suitable source of electric energy, such as a battery 27, as disclosed in Figure 6 of the drawings, and the circuit also includes normally opened spring switches 28, 29 and 30 that are arranged on the bar 13 in the path of contact with the respective arms 19, 20 and 21, when the armatures of the said arms have been attracted by the magnets and the said arms have their rear ends thus swung upwardly against the tension of the springs 22. The magnets are connected by suitable conductors 31 to the lamp circuit, and each of the magnet circuits is controlled by a switch, preferably in the nature of a push button 32, which is located at a convenient point for operation by the driver of the vehicle.

The central arm 20 has its rear end provided with a downturned portion 33 that terminates in an upwardly directed substantially U-shaped spring clip 34, and to this clip there is secured a signal 35. The signal 35 has the word "Stop" imprinted thereon. The rear ends of the rods 19 and 21 have angle portions directed toward the opposed sides of the casing, and are from thence continued in a line parallel with the rods proper and parallel with the sides of the casing. These mentioned portions are indicated by the numerals 36 and 37 respectively. It will be noted that the straight portion 36 is of a slightly less length than the straight portion 37 of the arm 21, but the ends of both of these straight portions have inwardly directed spring clips to which are secured signal plates 38 and 39, respectively.

The signal plate 38 has imprinted thereon the word "Right," and the signal plate 39 has imprinted thereon the word "Left." All of the signal plates are preferably transparent, and the signals thereon are painted. By this arrangement, it will be apparent that rays from the lamp 26 directed toward the signal plates will pass through the transparent portions thereof against the reflector 7 and from thence be directed outward through the sight opening 9 in the casing, so that the signal which is brought to signalling position, in a manner which will presently be described, will be distinctly visible through the sight opening.

As vehicles generally turn to the right a greater number of times than to the left, I have arranged the "Right" signal nearest the display opening in the casing. The next signal most used is the "Left," and therefore I have arranged the "Left" signal directly to the rear of the "Right" signal, and the 'Stop" signal, which is least used, to the rear of the "Left" signal. By reference to Figures 3 and 4 of the drawings, it will be seen that the signals are in lapping relation or rather, one of the signals is disposed directly to the rear of the other, and each of the signal plates is preferably slightly curved in cross section. By closing the magnet switch, say to bring the "Right" signal to signalling position, the current flowing from the battery 27 energizes the magnet 10 which attracts the armature 25 connected to the arm 19. This causes the arm to be swung against the tension of the spring 22, and brings the signal plate 38 to a position directly opposite the sight opening in the casing. The downward movement of the arm 19 closes the switch 28 in the lamp circuit, and illuminates the lamp. Thus the rays from the lamp are directed, as previously stated against the elevated signal, and to positively direct the lamp rays in such direction, a shield 42 may be arranged on the outer face of the said lamp. It will be apparent that by operating the other push buttons or switches the other magnets will attract the armatures on the arms 20 and 21, thus bringing the remaining signalling plates to signalling position. As long as the switches 32 are held closed the signals will be displayed. When the switches are brought to open position, the springs 22 will swing the arms to their normal position, and said arms being contacted by the buffers 23 will not be subjected to abnormal shock or jar when brought to such position. The buffers also serve as means for limiting the swinging of the arms when influenced by the springs 22 so that the signals cannot contact with the bottom or floor of the casing 6.

Having described the invention, I claim:—

An automobile signal of the class described, including a casing, said casing having a sight opening at the front thereof, arms pivotally supported in the casing, the central arm having a depending portion terminating in a spring clip, the remaining arms having their inner ends provided with angle portions that terminate in straight extensions which are provided with spring clips, curved transparent signal plates engaged by the clips and disposed one to the rear of the other and forward of the reflector, non-transparent signals on each of the plates, spring means biasing the arms to swing the inner ends thereof toward the base of the casing and to bring the signals below the sight opening, buffer means contacting the arms and limiting the movement thereof in their last mentioned direction, and means for singly swinging the arms to bring the signal plates thereon to signalling position opposite the sight opening.

In testimony whereof I affix my signature.

WILLIAM W. LINCOLN.